(12) United States Patent
Matsumura et al.

(10) Patent No.: US 10,444,450 B2
(45) Date of Patent: Oct. 15, 2019

(54) OPTICAL MODULE

(71) Applicant: FUJITSU LIMITED, Kawasaki-shi, Kanagawa (JP)

(72) Inventors: Takayoshi Matsumura, Yokohama (JP); Naoaki Nakamura, Kawasaki (JP); Kenji Fukuzono, Kawasaki (JP); Norio Kainuma, Nagano (JP); Takashi Kubota, Chikuma (JP); Takumi Masuyama, Kawasaki (JP); Yuki Hoshino, Yokohama (JP); Hidehiko Kira, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/985,767

(22) Filed: May 22, 2018

(65) Prior Publication Data

US 2018/0341075 A1    Nov. 29, 2018

(30) Foreign Application Priority Data

May 25, 2017  (JP) .................................. 2017-103689

(51) Int. Cl.
*G02B 6/42* (2006.01)
*H04B 10/50* (2013.01)

(52) U.S. Cl.
CPC ......... *G02B 6/4268* (2013.01); *G02B 6/4274* (2013.01); *H04B 10/505* (2013.01); *G02B 6/4245* (2013.01)

(58) Field of Classification Search
CPC .. G02B 6/4268; G02B 6/4245; G02B 6/4274; H04B 10/505
See application file for complete search history.

(56) References Cited

U.S. PATENT DOCUMENTS

| | | | |
|---|---|---|---|
| 2002/0110335 A1* | 8/2002 | Wagner ................. | G02B 6/422 385/89 |
| 2011/0044367 A1* | 2/2011 | Budd ................... | G02B 6/4201 372/50.21 |
| 2011/0157891 A1* | 6/2011 | Davis ................ | B29C 45/14467 362/244 |
| 2016/0216445 A1* | 7/2016 | Thacker ............ | G02B 6/12004 |

FOREIGN PATENT DOCUMENTS

JP         2004-096000         3/2004

* cited by examiner

*Primary Examiner* — Peter Radkowski
(74) *Attorney, Agent, or Firm* — Fujitsu Patent Center

(57) ABSTRACT

An optical module includes a substrate, a silicon photonics chip disposed in an opening of the substrate, a control chip disposed across the substrate and the silicon photonics chip, a plurality of laser diodes disposed over the silicon photonics chip, and a metallic bar in contact with each of terminals of the plurality of laser diodes and electrically coupling each of the terminals with the silicon photonics chip or the substrate.

9 Claims, 11 Drawing Sheets

OPTICAL MODULE

CROSS-REFERENCE TO RELATED APPLICATION

This application is based upon and claims the benefit of priority of the prior Japanese Patent Application No. 2017-103689, filed on May 25, 2017, the entire contents of which are incorporated herein by reference.

FIELD

The embodiments discussed herein are related to an optical module.

BACKGROUND

In the related art, there is an optical module that converts an input electric signal into an optical signal and outputs the converted optical signal. Such an optical module is configured, for example, by mounting a laser diode and a control chip on a silicon photonics chip. In the related art, there is a technique in which an electronic component is disposed across a photoelectric conversion substrate and an electric circuit substrate.

However, in the technique described above, for example, in a case where the control chip and a plurality of laser diodes are disposed on the silicon photonics chip, there is a problem that the laser diode close to the control chip becomes high in temperature due to heat of the control chip and output of the laser diode is lowered.

The following is a reference document.
[Document 1] Japanese Laid-open Patent Publication No. 2004-096000.

SUMMARY

According to an aspect of the invention, an optical module includes a substrate, a silicon photonics chip disposed in an opening of the substrate, a control chip disposed across the substrate and the silicon photonics chip, a plurality of laser diodes disposed over the silicon photonics chip, and a metallic bar in contact with each of terminals of the plurality of laser diodes and electrically coupling each of the terminals with the silicon photonics chip or the substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, embodiments of an optical module according to the disclosure will be described in detail with reference to the drawings.

Embodiment 1

Example of Optical Module According to Embodiment 1

Figure 1:
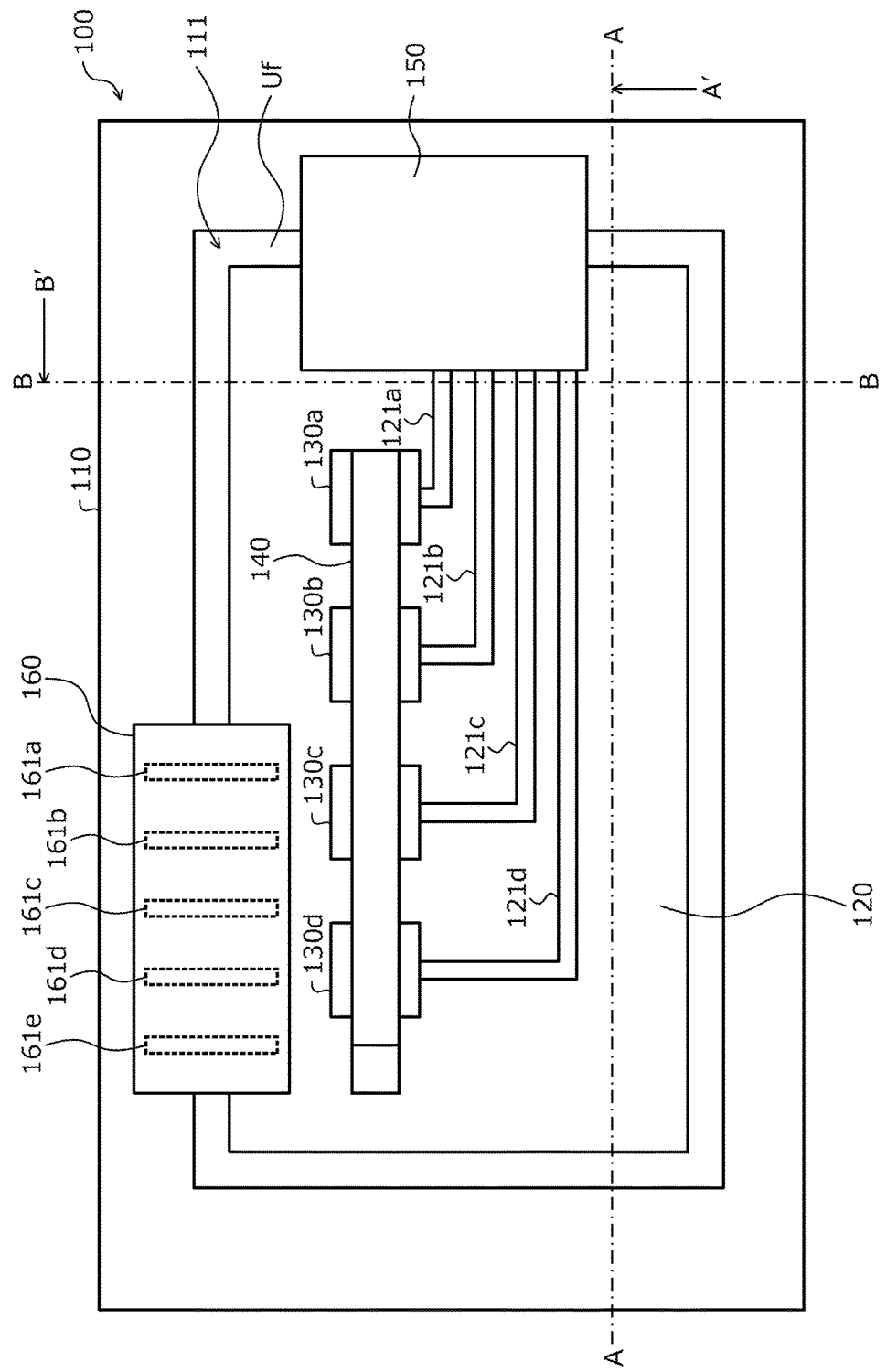
FIG. 1 is a diagram illustrating an example of an optical module according to Embodiment 1.

FIG. 1 is a diagram illustrating an example of an optical module according to Embodiment 1. An optical module 100 according to Embodiment 1 illustrated in FIG. 1 is, for example, an optical module that converts an input electric signal into an optical signal and outputs the converted optical signal. As an example, the optical module 100 is incorporated into a QSFP module. QSFP stands for Quad Small Form-Factor Pluggable.

The QSFP module is provided at an end portion of a QSFP cable that directly connects server devices. The optical module 100 may be incorporated into another optical transmission module such as a QSFP+module or an optical transceiver.

As illustrated in FIG. 1, the optical module 100 includes, for example, a substrate 110, a silicon photonics chip 120, laser diodes 130a to 130d, a metal bar 140, and a control chip 150.

In the following description, the silicon photonics chip may be denoted by a "Si-Ph chip", and the laser diode may be denoted by an "LD". Also, a surface illustrated in FIG. 1 is defined as an upper surface in each configuration of the optical module 100 and a surface opposite to the surface illustrated in FIG. 1 is defined as a lower surface in each configuration of the optical module 100.

The substrate 110 is formed in, for example, a rectangular shape. An opening 111 is formed at a predetermined position (for example, a substantially central portion) of the substrate 110. The opening 111 penetrates from the upper surface to the lower surface of the substrate 110. The opening 111 is formed to be slightly larger than the Si-Ph chip 120, for example. With this, it is possible to dispose the Si-Ph chip 120 in the opening 111.

The substrate 110 is provided with an electric circuit. The electric circuit of the substrate 110 includes, for example, an electric circuit capable of outputting drive power for the LDs 130a to 130d. For example, a terminal (electrode) for outputting drive power for the LDs 130a to 130d is provided on the substrate 110, and the electric circuit of the substrate 110 outputs drive power for the LDs 130a to 130d via the terminal.

The electric circuit of the substrate 110 includes, for example, an electric circuit capable of outputting drive power for the control chip 150. For example, the substrate 110 is provided with a terminal for outputting drive power for the control chip 150, and the electric circuit of the substrate 110 outputs drive power for the control chip 150 via the terminal.

The electric circuit of the substrate 110 includes, for example, an electric circuit capable of outputting an electric signal to be converted into an optical signal by the optical module 100. For example, a terminal for outputting the electric signal to be converted into the optical signal by the optical module 100 is provided on the substrate 110, and the electric circuit of the substrate 110 outputs an electric signal to be converted into an optical signal via the terminal. Also, a terminal or the like connected to the ground of the electric circuit of the substrate 110 may be provided on the substrate 110.

The substrate 110 may be realized by a printed board, for example. That is, the substrate 110 may be realized by providing an electronic component (for example, an integrated circuit, a resistor, a capacitor, a transistor, and the like) and a wiring connecting electronic components to an insulator base material such as epoxy resin.

The Si-Ph chip 120 is, for example, formed in a rectangular shape and disposed in the opening 111. For example, an underfill material Uf is filled between the substrate 110 and the Si-Ph chip 120. With this, the Si-Ph chip 120 is fixed to the substrate 110. As an example, the underfill material Uf may be realized with liquid curable resin such as epoxy resin.

For example, the Si-Ph chip 120 is provided with optical waveguides 121a to 121d and an optical modulator (not illustrated) that modulates light traveling through the optical waveguides 121a to 121d.

The optical waveguide 121a is an optical waveguide onto which light emitted from the LD 130a is incident and emits the incident light. The optical waveguide 121b is an optical waveguide onto which light emitted from the LD 130b is incident and emits the incident light. The optical waveguide 121c is an optical waveguide onto which light emitted from the LD 130c is incident and emits the incident light. The optical waveguide 121d is an optical waveguide onto which light emitted from the LD 130d is incident and emits the incident light.

The optical modulator of the Si-Ph chip 120 modulates light traveling through the optical waveguides 121a to 121d under the control of the control chip 150. For example, the optical modulator is provided at a position facing the control chip 150 in the Si-Ph chip 120. For that reason, as illustrated in FIG. 1, the optical waveguides 121a to 121d include a portion that may propagate light emitted from the LDs 130a to 130d to the optical modulator which is provided to face the control chip 150. By doing as described above, it is possible to shorten a wiring between the control chip 150 and the optical modulator and improve communication performance between the control chip 150 and the optical modulator by arranging the optical modulator at a position close to the control chip 150 in the Si-Ph chip 120.

For example, the optical modulator is provided for each optical waveguide of the optical waveguides 121a to 121d, and modulates light traveling through each optical waveguide. With this, it is possible to generate different optical signals for each optical waveguide of the optical waveguides 121a to 121d. As an example, the optical modulator may be realized by a Mach-Zehnder type modulator.

An electric circuit is provided in the Si-Ph chip 120. The electric circuit of the Si-Ph chip 120 includes, for example, an electric circuit capable of receiving an input of drive power for the LDs 130a to 130d and supplying the received drive power to the LDs 130a to 130d.

For example, the Si-Ph chip 120 is provided with terminals and wirings for receiving the input of drive power for the LDs 130a to 130d, terminals and wirings for supplying the received drive power to the LDs 130a to 130d. Then, for example, the electric circuit of the Si-Ph chip 120 receives the input of drive power for the LDs 130a to 130d or supplies the received drive power to the LDs 130a to 130d via the terminals and wiring. Also, the Si-Ph chip 120 may be provided with terminals and the like connected to the ground in the electric circuit of the Si-Ph chip 120.

The Si-Ph chip 120 may be realized by, for example, a Si-Ph chip in which various optical elements and electronic elements are integrated on a silicon substrate.

The LDs 130a to 130d are disposed at predetermined positions on the upper surface of the Si-Ph chip 120. For example, as illustrated in FIG. 1, the LDs 130a to 130d are disposed to be aligned along the longitudinal direction of the Si-Ph chip 120. In the example illustrated in FIG. 1, the LD 130a, the LD 130b, the LD 130c, and the LD 130d are disposed in order from a side near the control chip 150.

For that reason, in the example illustrated in FIG. 1, heat from the control chip 150 is easily transferred in the order of the LD 130a, the LD 130b, the LD 130c, and the LD 130d. Accordingly, in this case, the LD 130a becomes the LD which is liable to be the highest temperature and the LD 130d becomes the LD which is hard to reach the highest temperature.

The LD 130a emits predetermined light (for example, light having a fixed wavelength or intensity) into the optical waveguide 121a by being supplied with drive power. Similarly, the LDs 130b to 130d emit predetermined light into the optical waveguides 121b to 121d by being supplied with drive power. For example, the LDs 130a to 130d may be realized by a light emitting module including a laser oscillator that oscillates predetermined light by being supplied with drive power.

Although details will be described later with reference to FIG. 2 and the like, each of the LDs 130a to 130d is provided with a pair of terminals for receiving supply of drive power. Then, a drive voltage is applied to one terminal of the pair of terminals and the other terminal is electrically connected to the ground (that is, 0[V] is applied), so that drive power is supplied to the LDs 130a to 130d. For example, one terminal of the pair of terminals is provided on the lower surface (that is, surface to be the Si-Ph chip 120 side) of the LDs 130a to 130d and the other terminal is provided on the upper surface (that is, surface to be the metal bar 140 side) of the LDs 130a to 130d.

The metal bar 140 is a metallic bar that is capable of conducting heat and is provided in contact with each of the terminals on the upper surfaces of the LDs 130a to 130d. With the metal bar 140, the LDs 130a to 130d may be thermally connected and temperatures of the LDs 130a to 130d may be equalized. Accordingly, a temperature of an LD (for example, the LD 130a disposed closest to the control chip 150) having the highest temperature among the LDs 130a to 130d may be lowered close to the temperature of other LDs.

The metal bar 140 may be provided in contact with the Si-Ph chip 120. By doing as described above, the LDs 130a to 130d and the Si-Ph chip 120 may be thermally connected via the metal bar 140. In this case, heat of the LDs 130a to 130d may be dispersed to the Si-Ph chip 120, and the temperature of the LDs 130a to 130d may be lowered.

The metal bar 140 is a conductor capable of electrically connecting the terminals on the upper surfaces of the LDs 130a to 130d and the Si-Ph chip 120 or the substrate 110. For example, the metal bar 140 is provided connected to the ground in the electric circuit of the Si-Ph chip 120 or the electric circuit of the substrate 110. With such a metal bar 140, the terminals on the upper surfaces of the LDs 130a to 130d may be electrically connected to the ground collectively.

As an example, the metal bar 140 may be realized by a metal member such as copper machined into a predetermined shape. The metal bar 140 may be plated with nickel plating, gold plating or the like. The metal bar 140 will be described again with reference to FIG. 2 and the like.

The control chip 150 is provided across the substrate 110 and the Si-Ph chip 120. With this, portion of heat of the control chip 150 may be directly transferred to the substrate 110, and heat of the control chip 150 transferred to the Si-Ph chip 120 may be reduced. Accordingly, it is possible to lower the temperature of the Si-Ph chip 120 and the temperature of the LDs 130a to 130d.

The control chip 150 is, for example, a flip chip in which terminals are provided on the lower surface. For example, a terminal to which drive power for the control chip 150 is input is provided at a position facing the substrate 110 on the lower surface of the control chip 150. The terminal to which drive power for the control chip 150 is input and which is provided on the lower surface of the control chip 150 is bonded to a terminal from which drive power for the control chip 150 is output and which is provided on the upper surface of the substrate 110 by bumps or the like. With this, the control chip 150 may be driven by supplying drive power from the substrate 110 to the control chip 150.

For example, a terminal to which an electric signal to be converted into an optical signal is input is provided at a position facing the substrate 110 on the lower surface of the control chip 150. A terminal to which the electric signal to be converted to the optical signal is input and which is provided on the lower surface of the control chip 150 is bonded to a terminal from which an electric signal to be converted to an optical signal is output and which is provided on the upper surface of the substrate 110, by bumps or the like. With this, it is possible to input an electric signal to be converted into an optical signal from the substrate 110 to the control chip 150, and cause the control chip 150 to perform modulation based on the electric signal.

For example, a terminal from which an electric signal for controlling the optical modulator is output is provided at a position facing the Si-Ph chip 120 on the lower surface of the control chip 150. The terminal from which the electric signal for controlling the optical modulator is output and which is provided on the lower surface of the control chip 150 is bonded to a terminal of the optical modulator by bumps or the like. With this, it is possible to output an electrical signal for controlling the optical modulator from the control chip 150 to the optical modulator, and cause the optical modulator to perform modulation based on the electrical signal.

The optical signal modulated by the optical modulator under the control of the control chip 150 is output to the outside of the optical module 100 via, for example, an optical waveguide (not illustrated). The optical waveguide may be an optical waveguide formed in the Si-Ph chip 120, or an optical fiber or the like provided outside the Si-Ph chip 120.

The optical module 100 may be provided with a power-feed substrate 160. The power-feed substrate 160 is provided across the substrate 110 and the Si-Ph chip 120, and electrically connects the substrate 110 and the Si-Ph chip 120. For example, wirings 161a to 161e are provided on the power-feed substrate 160. Here, the wirings 161a to 161e are provided on the lower surface of the power-feed substrate 160 across the substrate 110 and the Si-Ph chip 120.

Then, for example, end portions of the wirings 161a to 161e on the side of the substrate 110 are bonded to terminals from which drive power for the LDs 130a to 130d is output and which are provided on the upper surface of the substrate 110 by bumps, solder, or the like. The end portions of the wirings 161a to 161e on the side of the Si-Ph chip 120 are bonded to terminals to which drive power for the LDs 130a to 130d is input and which are provided on the upper surface of the Si-Ph chip 120 by bumps, solder, or the like.

With such a power-feed substrate 160, drive power for the LDs 130a to 130d output from the electric circuit of the substrate 110 may be input to the electric circuit of the Si-Ph chip 120. The power-feed substrate 160 may transfer heat of the Si-Ph chip 120 to the substrate 110. For that reason, the temperature of the Si-Ph chip 120 may be lowered by dispersing heat of the Si-Ph chip 120, and it is possible to lower the temperature of the LDs 130a to 130d.

The power-feed substrate 160 may be provided with wirings or the like for connecting the ground of the electric circuit of the substrate 110 and the ground of the electric circuit of the Si-Ph chip 120. As one example, any of the wirings 161a to 161e (for example, wiring 161c) may be a wiring connecting the ground of the electric circuit of the substrate 110 and the ground of the electric circuit of the Si-Ph chip 120.

The power-feed substrate 160 may be realized by a printed board provided with the wirings 161a to 161e and the like on an insulator base material such as epoxy resin or the like.

Example of Metal Bar According to Embodiment 1

Next, an example of the metal bar 140 according to Embodiment 1 will be described. FIG. 2 is a diagram illustrating an example of the metal bar according to Embodiment 1. In FIG. 2, the same reference numerals are given to the same configurations as those in FIG. 1, and the description thereof will be omitted. FIG. 2 illustrates an example of a case where a cross-section taken along line A-A in FIG. 1 when viewed from A'. In FIG. 2, illustration of the power-feed substrate 160 is omitted.

Figure 2:
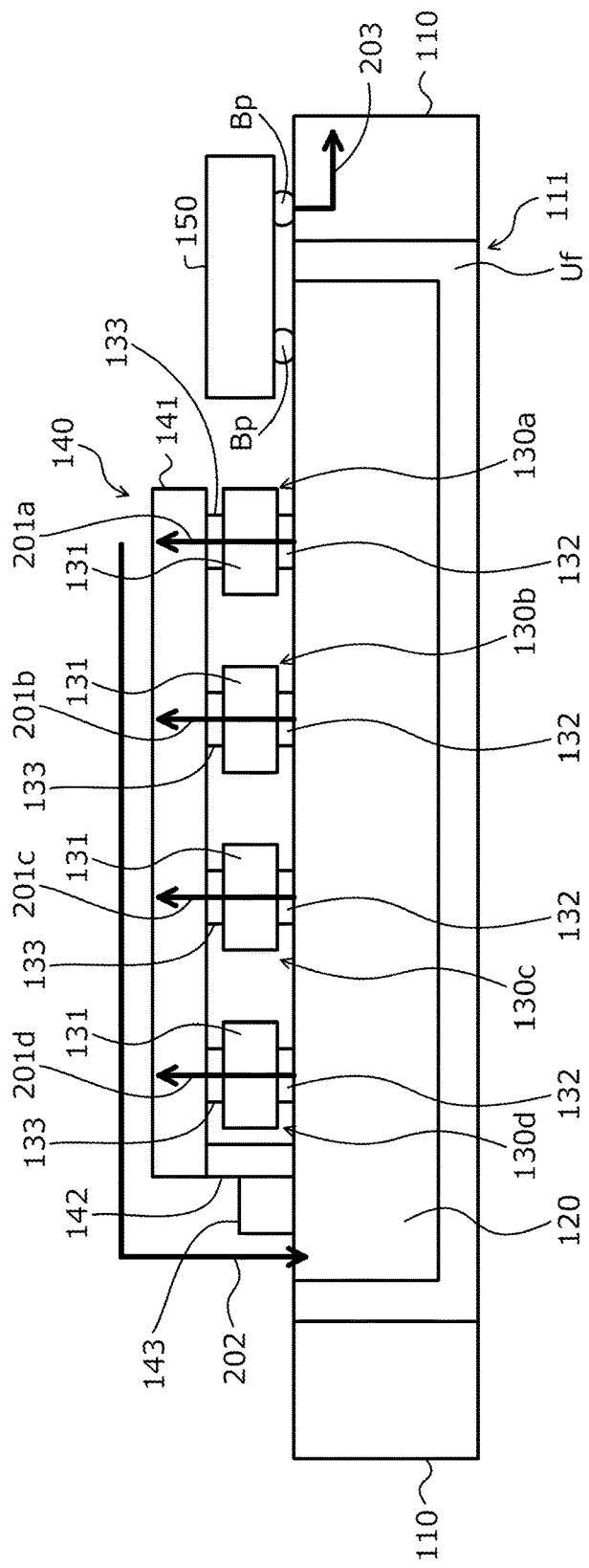
FIG. 2 is a diagram illustrating an example of a metal bar according to Embodiment 1.

As illustrated in FIG. 2, each of the LDs 130a to 130d include, for example, a base material 131, a terminal 132, and a terminal 133. Each of the base material 131 is provided with, for example, a laser oscillator, a driving circuit for LDs 130a to 130d, and the like.

The terminals 132 are provided, for example, on the lower surface (that is, surface to be the Si-Ph chip 120 side) of the base materials 131, and are in contact with terminals, wirings, and the like of the Si-Ph chip 120. With this, a drive voltage of, for example, each of the LDs 130a to 130d is applied to the each of terminals 132. The terminals 133 are provided, for example, on the upper surface (that is, surface to be the metal bar 140 side) of the base material 131 and are in contact with the metal bar 140 (upper portion 141 to be described later).

As illustrated in FIG. 2, the metal bar 140 includes, for example, an upper portion 141, a side portion 142, and a lower portion 143. The upper portion 141 is provided in contact with each of the terminals 133 of the LDs 130a to 130d. The side portion 142 is provided so as to extend from a predetermined position of the upper portion 141 toward the Si-Ph chip 120, and the lower portion 143 for fixing the metal bar 140 to the Si-Ph chip 120 is provided on the Si-Ph chip 120 side of the side portion 142. That is, the side portion 142 and the lower portion 143 hold the upper portion 141 in contact with each of the terminals 133 of the LDs 130a to 130d.

The metal bar 140 is fixed to the upper surface of the Si-Ph chip 120, for example, by fixing the lower portion 143 to a predetermined position on the upper surface of the Si-Ph chip 120 with screws, solder, or the like. At a position where the lower portion 143 is fixed, for example, terminals connected to the ground are provided. For that reason, in a case where the lower portion 143 is fixed to the Si-Ph chip 120, it is possible to treat the metal bar 140 as a conductor connected to the ground.

With this, it is possible to electrically connect the terminal 133 of the LDs 130a to 130d to the ground while applying the drive voltages of the LDs 130a to 130d to each of the terminals 132 of the LDs 130a to 130d. For that reason, drive power is supplied to the LDs 130a to 130d, and the LDs 130a to 130d may be driven.

By doing as described above, in the optical module 100, terminals 133 of the LDs 130a to 130d may be collectively connected to the ground by the metal bar 140. For that reason, the wiring may be simplified as compared with the case where the terminals 133 of the LDs 130a to 130d are individually connected to the ground by wire bonding.

In a case where the terminals 133 of the LDs 130a to 130d are individually connected to the ground by wire bonding, each of grounding terminals is provided in the Si-Ph chip 120 by being corresponded to each wire bonding. In this case, a space for arranging these ground terminals is may be secured in the Si-Ph chip 120, which may increase a size of the Si-Ph chip 120.

In contrast, in a case where the terminals 133 of the LDs 130a to 130d are collectively connected to the ground by the metal bar 140, one ground terminal may be provided at a position where, for example, the lower portion 143 is fixed. For that reason, the number of terminals provided in the Si-Ph chip 120 may be reduced, miniaturization of the Si-Ph chip 120 may be achieved.

In the example illustrated in FIG. 2, heat of the LD 130a is transferred to the metal bar 140 as illustrated in a heat radiation path 201a, and heat of the LD 130b is transferred to the metal bar 140 as illustrated in a heat radiation path 201b. Heat of the LD 130c is transferred to the metal bar 140 as illustrated in a heat radiation path 201c, and heat of the LD 130d is transferred to the metal bar 140 as illustrated in a heat radiation path 201d.

Then, heat transferred to the metal bar 140 is transferred to the Si-Ph chip 120 as illustrated in a heat radiation path 202. With this, heat of the LDs 130a to 130d may be dispersed to the metal bar 140 and the Si-Ph chip 120, and the temperature of the LDs 130a to 130d may be lowered.

The side portion 142 and the lower portion 143 are provided at positions other than positions closest to the control chip 150 in the metal bar 140, for example. In the example illustrated in FIG. 2, the side portion 142 and the lower portion 143 are provided at the end portion of the upper portion 141 on the side of the LD 130d. Here, the LD 130d is an LD disposed furthest from the control chip 150 among the LDs 130a to 130d. By providing the side portion 142 and the lower portion 143 at positions other than the position closest to the control chip 150 in the metal bar 140, heat of the control chip 150 transferred to the side portion 142 and the lower portion 143 may be reduced. Accordingly, the effect of cooling the LDs 130a to 130d by the metal bar 140 may be enhanced.

As illustrated in FIG. 2, the control chip 150 is disposed across the substrate 110 and the Si-Ph chip 120. For example, the terminal provided on the lower surface of the control chip 150 and the terminal provided on the upper surface of the substrate 110 and the Si-Ph chip 120 are bonded by a bump Bp. For that reason, portion of heat of the control chip 150 is transferred to the substrate 110 as illustrated in a heat radiation path 203.

With this, heat of the control chip 150 may be dispersed to the substrate 110, and the temperature of the control chip 150 may be lowered. Also, heat of the control chip 150 transferred to the Si-Ph chip 120 may be reduced, and the temperature of the Si-Ph chip 120 may be lowered.

Accordingly, heat of the control chip 150 transferred to the LDs 130a to 130d may be reduced, and the temperatures of the LDs 130a to 130d may be reduced and equalized. For that reason, outputs of the LDs 130a to 130d may be stabilized, and quality of the optical signal output from the optical module 100 may be improved.

In a case where the control chip 150 and the substrate 110 are bump-bonded, it is possible to shorten a distance between the terminals of the control chip 150 and the terminals of the substrate 110, as compared with the case where the control chip 150 and the substrate 110 are connected by wire bonding. Accordingly, it is possible to reduce thermal resistance between the control chip 150 and the substrate 110 and facilitate transfer of heat.

In a case where the control chip 150 and the Si-Ph chip 120 are bump-bonded, the distance between the terminals of the control chip 150 and the terminals of the Si-Ph chip 120 may be made shorter than in the case where the control chip 150 and the Si-Ph chip 120 are connected by wire bonding. Accordingly, it is possible to reduce thermal resistance between the control chip 150 and the Si-Ph chip 120 and facilitate transfer of heat.

As illustrated in FIG. 2, for example, the Si-Ph chip 120 is fixed to the substrate 110 by an underfill material Uf in a state where the upper surface of the Si-Ph chip 120 is set to substantially the same height as the upper surface of the substrate 110. With this, it is possible to facilitate bump bonding between the control chip 150 and the substrate 110 and the Si-Ph chip 120.

The upper portion 141, the side portion 142, and the lower portion 143 may be formed integrally with one metal member, for example, or each portion may be formed with a different metal member. However, in the case where each portion is formed with a different metal member, it is assumed that the metal members of the portions are brought into close contact with each other, and thermal conductivity and conductivity of the entire metal bar 140 are secured.

In the examples illustrated in FIGS. 1 and 2, an example in which the underfill material Uf is provided between four sides of the Si-Ph chip 120 in the longitudinal direction and the traverse direction and the substrate 110 and provided on the lower surface side of the Si-Ph chip 120, but is not limited thereto. The underfill material Uf may be provided at least between one surface of the Si-Ph chip 120 and one surface of the substrate 110 among facing surface of the Si-Ph chip 120 and substrate 110. For example, the underfill material Uf may be provided only between two sides of the Si-Ph chip 120 in the traverse direction in FIG. 1 and the substrate 110.

Example of Power-Feed Substrate According to Embodiment 1

Figure 3:
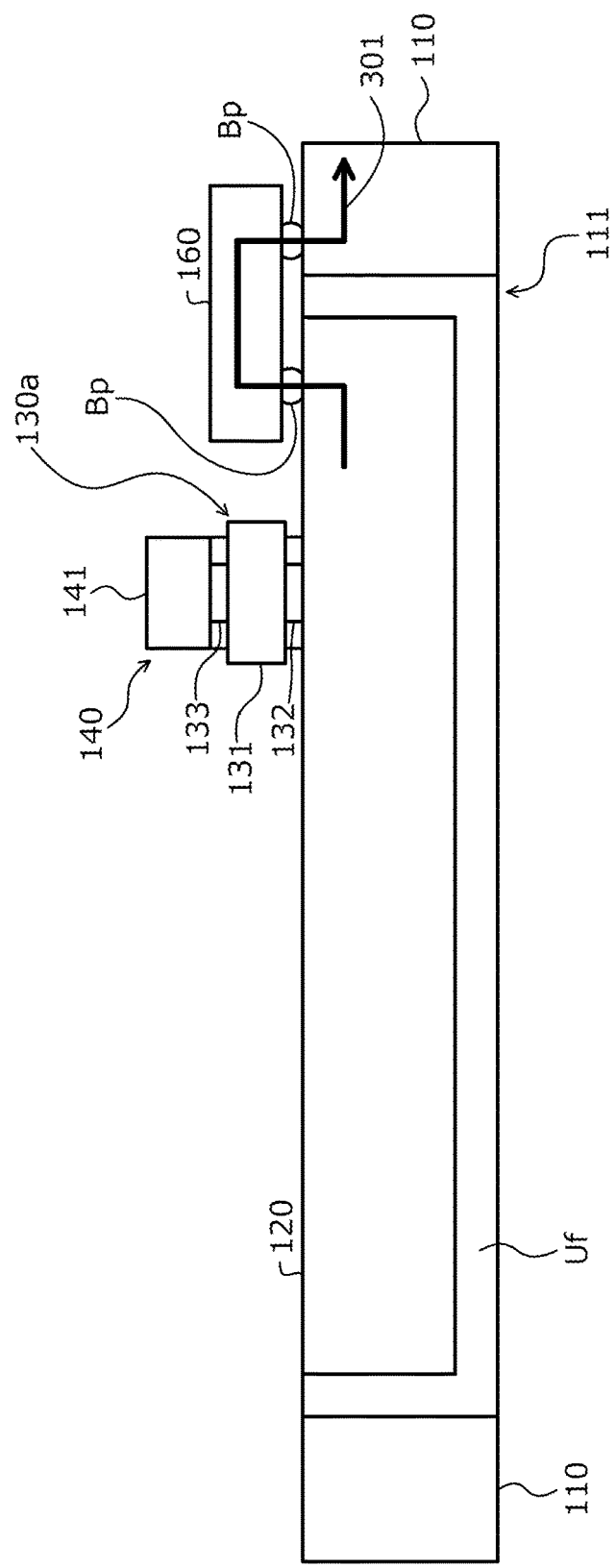
FIG. 3 is a diagram illustrating an example of a power-feed substrate according to Embodiment 1.

Next, the power-feed substrate 160 according to Embodiment 1 will be described. FIG. 3 is a diagram illustrating an example of a power-feed substrate according to Embodiment 1. FIG. 3 illustrates an example of a case where a cross-section taken along line B-B in FIG. 1 when viewed from B'. In FIG. 3, the same reference numerals are given to the same configurations as those in FIG. 1 and FIG. 2, and description thereof is omitted. In FIG. 3, illustration of the optical waveguides 121a to 121d is omitted.

As illustrated in FIG. 3, the power-feed substrate 160 is disposed across the substrate 110 and the Si-Ph chip 120. Then, the terminals (for example, terminals provided at the ends portions of the wirings 161a to 161e illustrated in FIG. 1) provided on the lower surface of the power-feed substrate 160 and the terminals provided on the upper surface of the substrate 110 and Si-Ph chip 120 are bonded by the bumps Bp.

For that reason, heat of the Si-Ph chip 120 including heat of the LDs 130a to 130d transferred to the Si-Ph chip 120 via the metal bar 140 is transferred to the substrate 110 as illustrated in a heat radiation path 301. With this, heat of the Si-Ph chip 120 may be dispersed to the substrate 110, and the temperature of the Si-Ph chip 120 may be lowered. Accordingly, heat of the LDs 130a to 130d may be easily transferred to the Si-Ph chip 120, and the temperature of the LDs 130a to 130d may be lowered.

In a case where the power-feed substrate 160 and the substrate 110 are bump-bonded, it is possible to shorten the distance between the terminals of the power-feed substrate 160 and the terminals of the substrate 110, as compared with the case where the power-feed substrate 160 and the substrate 110 are connected by wire bonding. Accordingly, it is possible to reduce thermal resistance between the power-feed substrate 160 and the substrate 110 and facilitate transfer of heat.

In a case where the power-feed substrate 160 and the Si-Ph chip 120 are bump-bonded, it is possible to shorten the distance between the terminals of the power-feed substrate 160 and the terminals of the Si-Ph chip 120, as compared with the case where the power-feed substrate 160 and the Si-Ph chip 120 are connected by wire bonding. Accordingly, it is possible to reduce thermal resistance between the power-feed substrate 160 and the Si-Ph chip 120 and facilitate transfer of heat.

As illustrated in FIG. 3, for example, the Si-Ph chip 120 is fixed to the substrate 110 by an underfill material Uf in a state where the upper surface of the Si-Ph chip 120 is set to substantially the same height as the upper surface of the substrate 110. With this, it is possible to facilitate bump bonding between the power-feed substrate 160 and the substrate 110 and the Si-Ph chip 120.

Example of Miniaturization of Si-Ph Chip by Optical Module According to Embodiment 1

Figure 4:
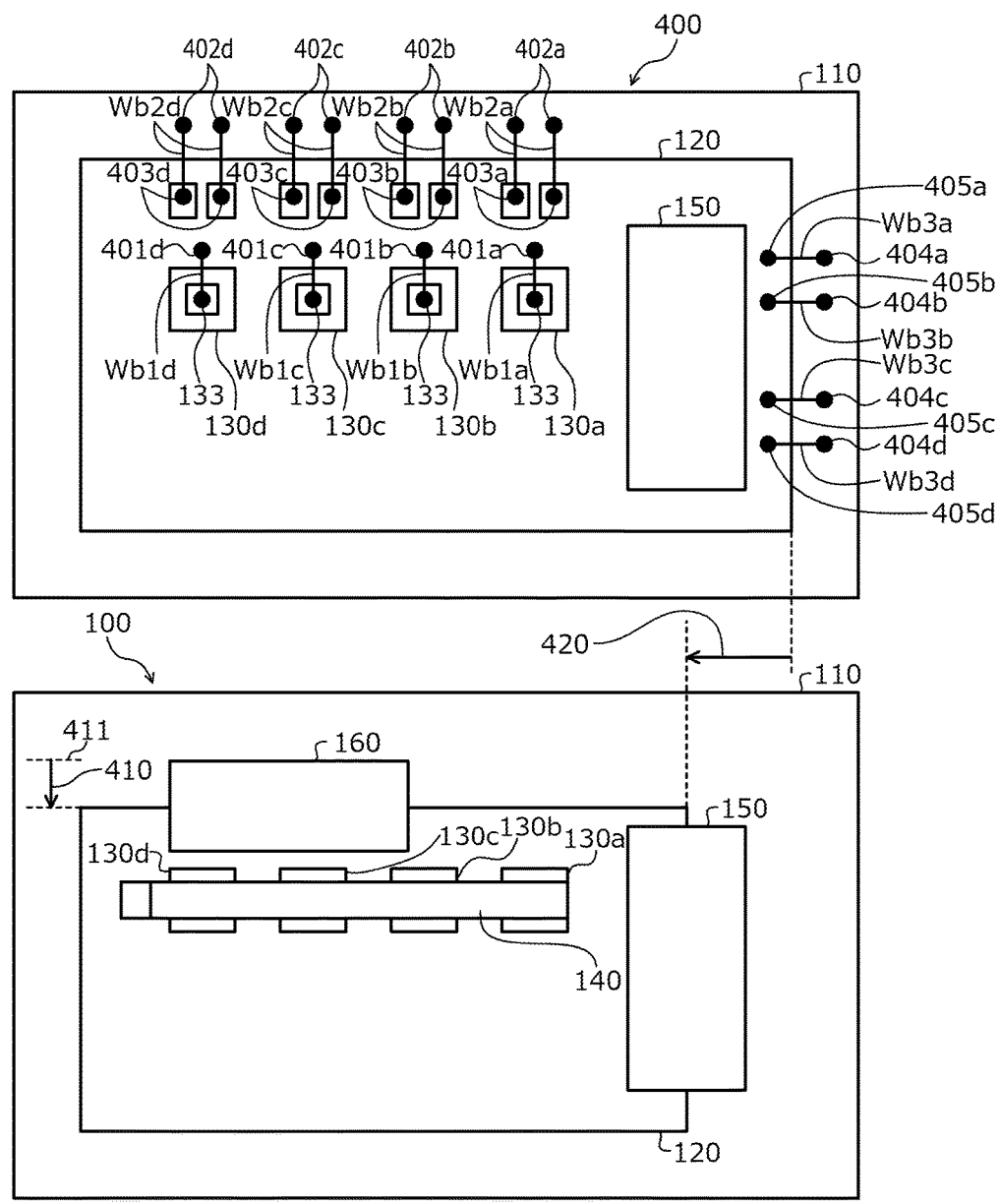
FIG. 4 is a diagram illustrating an example of miniaturization of a Si-Ph chip by the optical module according to Embodiment 1.

Next, an example of miniaturization of the Si-Ph chip 120 by the optical module 100 according to Embodiment 1 will be described. FIG. 4 is a diagram illustrating an example of miniaturization of the Si-Ph chip by the optical module according to Embodiment 1. In FIG. 4, the same reference numerals are given to the same configurations as those in FIG. 1, and the description thereof will be omitted. In FIG. 4, illustration of the optical waveguides 121a to 121d is omitted.

An optical module 400 illustrated in FIG. 4 illustrates an optical module as a reference when it is assumed that wire bonding is used for supplying drive power to the LDs 130a to 130d and electrically connecting the substrate 110 and the control chip 150.

For example, in the optical module 400, terminals 401a to 401d connected to the ground are provided on the upper surface of the Si-Ph chip 120. Then, in the optical module 400, the terminal 133 of the LD 130a and the terminal 401a are connected by wire bonding Wb1a, and the terminal 133 of the LD 130b and the terminal 401b are connected by wire bonding Wb1b. The terminal 133 of the LD 130c and the terminal 401c are connected by the wire bonding Wb1c, and the terminal 133 of the LD 130d and the terminal 401d are connected by the wire bonding Wb1d.

In contrast, in the optical module 100 according to Embodiment 1, the terminals 133 of the LDs 130a to 130d may be collectively connected to the ground via the metal bar 140. For that reason, the terminals 401a to 401d may not be provided on the upper surface of the Si-Ph chip 120.

For example, in the optical module 400, terminals 402a to 402d are provided on the upper surface of the substrate 110. Here, the terminals 402a to 402d are terminals from which drive power for the LDs 130a to 130d is output. In the optical module 400, terminals 403a to 403d are provided on the upper surface of the Si-Ph chip 120. Here, the terminals 403a to 403d are terminals to which drive power for the LDs 130a to 130d is input.

In the optical module 400, the terminal 402a and the terminal 403a are connected by wire bonding Wb2a, and the terminal 402b and the terminal 403b are connected by wire bonding Wb2b. The terminal 402c and the terminal 403c are connected by wire bonding Wb2c, and the terminal 402d and the terminal 403d are connected by wire bonding Wb2d.

In contrast, the optical module 100 according to Embodiment 1 may supply drive power for the LDs 130a to 130d to the Si-Ph chip 120 via the power-feed substrate 160. For that reason, the terminals 402a to 402d with large pitches for wire bonding may not be provided on the upper surface of the Si-Ph chip 120.

For example, in the optical module 400, terminals 404a to 404d are provided on the upper surface of the substrate 110. Here, the terminals 404a to 404d are terminals from which drive power for the control chip 150 is output. In the optical module 400, terminals 405a to 405d are provided on the upper surface of the Si-Ph chip 120. Here, the terminals 405a to 405d are terminals to which drive power for the control chip 150 is input.

In the optical module 400, the terminal 404a and the terminal 405a are connected by wire bonding Wb3a, and the terminal 404b and the terminal 405b are connected by wire bonding Wb3b. The terminal 404c and the terminal 405c are connected by wire bonding Wb3c, and the terminal 404d and the terminal 405d are connected by wire bonding Wb3d.

In contrast, the optical module 100 according to Embodiment 1 may directly input drive power and the like from the substrate 110 to the control chip 150. For that reason, the terminals 405a to 405d may not be provided on the upper surface of the Si-Ph chip 120.

Thus, in the optical module 100, it is possible to achieve miniaturization of the Si-Ph chip 120 as indicated by arrows 410 and 420. In FIG. 4, the dotted line 411 indicates the position of one side of the Si-Ph chip 120 when it is assumed that the metal bar 140 and the power-feed substrate 160 are not provided.

Example of Incorporating Optical Module According to Embodiment 1 into Casing

Figure 5:
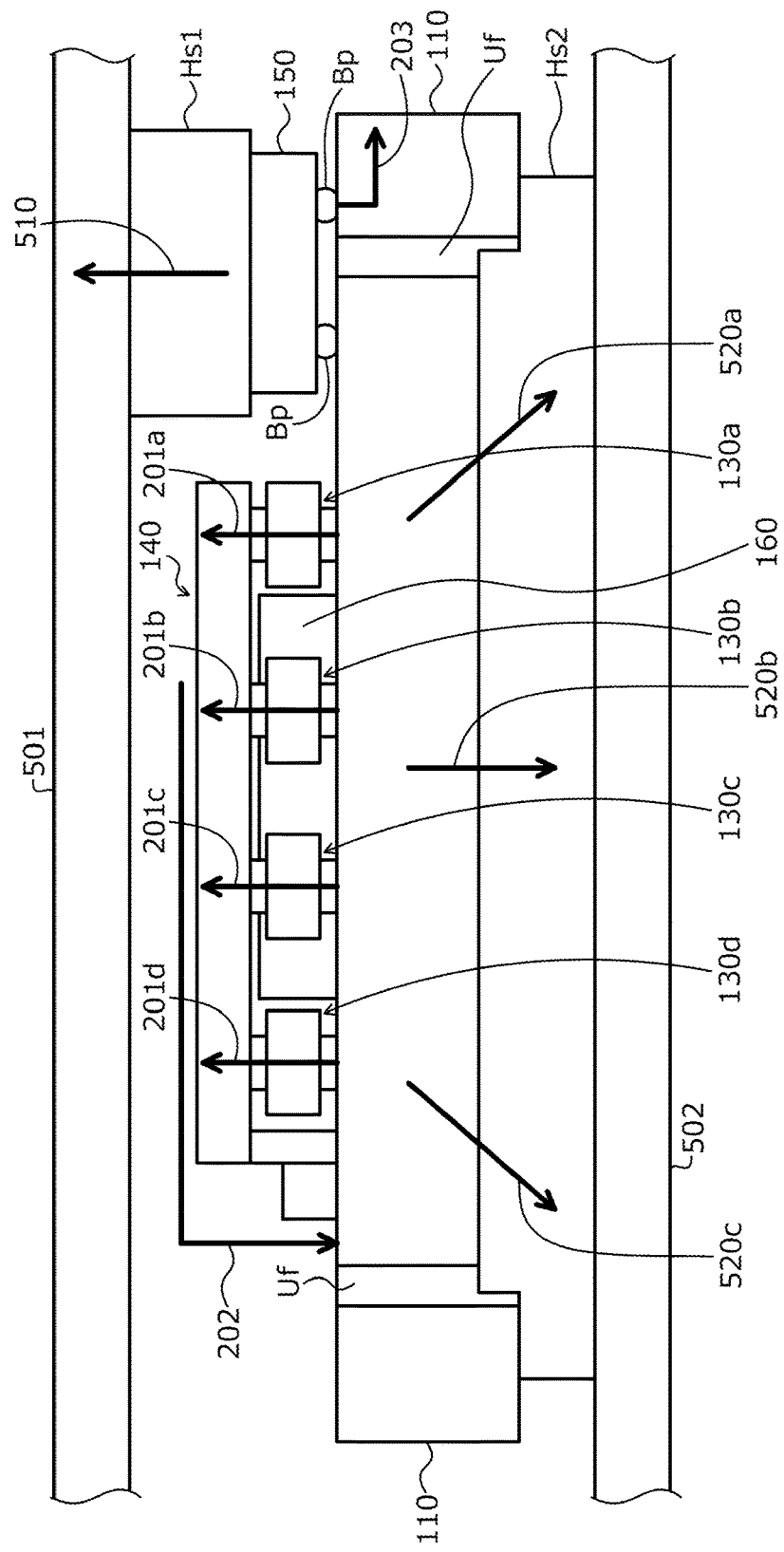
FIG. 5 is a diagram illustrating an example of incorporating the optical module according to Embodiment 1 into a casing.

Next, an example of incorporating the optical module 100 according to Embodiment 1 into a casing will be described. FIG. 5 is a diagram illustrating an example of incorporating the optical module according to Embodiment 1 into a casing. In FIG. 5, the same reference numerals are given to the same configurations as those in FIG. 2, and the description thereof will be omitted.

As illustrated in FIG. 5, for example, the optical module 100 is incorporated into a casing including an upper casing 501 and a lower casing 502. For example, a heat spreader Hs1 is provided between the upper surface of the control chip 150 and the upper casing 501. With this, as illustrated in a heat radiation path 510, heat of the control chip 150 may be dispersed to the upper casing 501, and the temperature of the control chip 150 may be lowered.

A heat transfer material such as thermal grease may be inserted between the control chip 150 and the heat spreader Hs1 or between the heat spreader Hs1 and the upper casing 501. With this, it is possible to more easily transfer heat of the control chip 150 to the upper casing 501 than in a case where the heat transfer material is not inserted between the control chip 150 and the heat spreader Hs1 or between the heat spreader Hs1 and the upper casing 501.

For example, a heat spreader Hs2 is provided between the lower surface of the Si-Ph chip 120 and the lower casing 502. With this, as illustrated in heat radiation paths 520a to 520c, heat of the Si-Ph chip 120 may be dispersed to the lower casing 502, and the temperature of the Si-Ph chip 120 may be lowered.

The heat transfer material such as thermal grease may be inserted between the Si-Ph chip 120 and the heat spreader Hs2 or between the heat spreader Hs2 and the lower casing 502. With this, it is possible to more easily transfer heat of the Si-Ph chip 120 to the lower casing 502 to the lower casing 502 than in a case where the heat transfer material is not inserted between the Si-Ph chip 120 and the heat spreader Hs2 or between the heat spreader Hs2 and the lower casing 502.

The heat spreaders Hs1 and Hs2 may be formed in, for example, a block shape, or may be formed by being provided with a plurality of fins.

As described above, according to the optical module 100 of Embodiment 1, heat of the control chip 150 may be directly transferred to the substrate 110 by disposing the control chip 150 across the substrate 110 and the Si-Ph chip 120. With this, heat of the control chip 150 received by the LDs 130a to 130d may be reduced, and the temperatures of the LDs 130a to 130d may be reduced and equalized. Accordingly, outputs of the LDs 130a to 130d may be stabilized, and quality of the optical signal output from the optical module 100 may be improved.

According to the optical module 100 of Embodiment 1, the wirings of the LDs 130a to 130d may be simplified by connecting the terminals 133 of the LDs 130a to 130d with the metal bar 140. The LDs 130a to 130d may be thermally connected and the temperatures of the LDs 130a to 130d may be equalized, by connecting the terminals 133 of the LDs 130a to 130d with the metal bar 140. For that reason, the temperature of the LD 130a which is most likely to receive high temperature from the control chip 150 may be lowered close to the temperature of the LDs 130b to 130d. Thus, according to the optical module 100 of Embodiment 1, it is possible to reduce and equalize the temperatures of the LDs 130a to 130d while achieving miniaturization of the Si-Ph chip 120. Then, outputs of the LDs 130a to 130d are stabilized, and quality of the optical signal output from the optical module 100 may be improved.

In the example described above, matters that, in the LDs 130a to 130d, a drive voltage is applied to each terminal 132 on the side of the Si-Ph chip 120 and each terminal 133 on the metal bar 140 side is connected to the ground by the metal bar 140 are described, but is not limited thereto. For example, on the upper surface of the Si-Ph chip 120, the wiring connected to the ground may be provided at a position in contact with each terminal 132 and the terminal or the like from which the drive voltage is applied may be provided at a position in contact with the lower portion 143.

By doing as described above, it is possible to apply the drive voltage collectively to each of the terminals 133 of the LDs 130a to 130d via the metal bar 140. Accordingly, also in this case, the wirings of the LDs 130a to 130d may be simplified.

Embodiment 2

With respect to Embodiment 2, portions different from those in Embodiment 1 will be described. Embodiment 2 is an example of a case where wire bonding is used for electrical connection between the substrate 110 and the Si-Ph chip 120.

Example of Optical Module According to Embodiment 2

Figure 6:
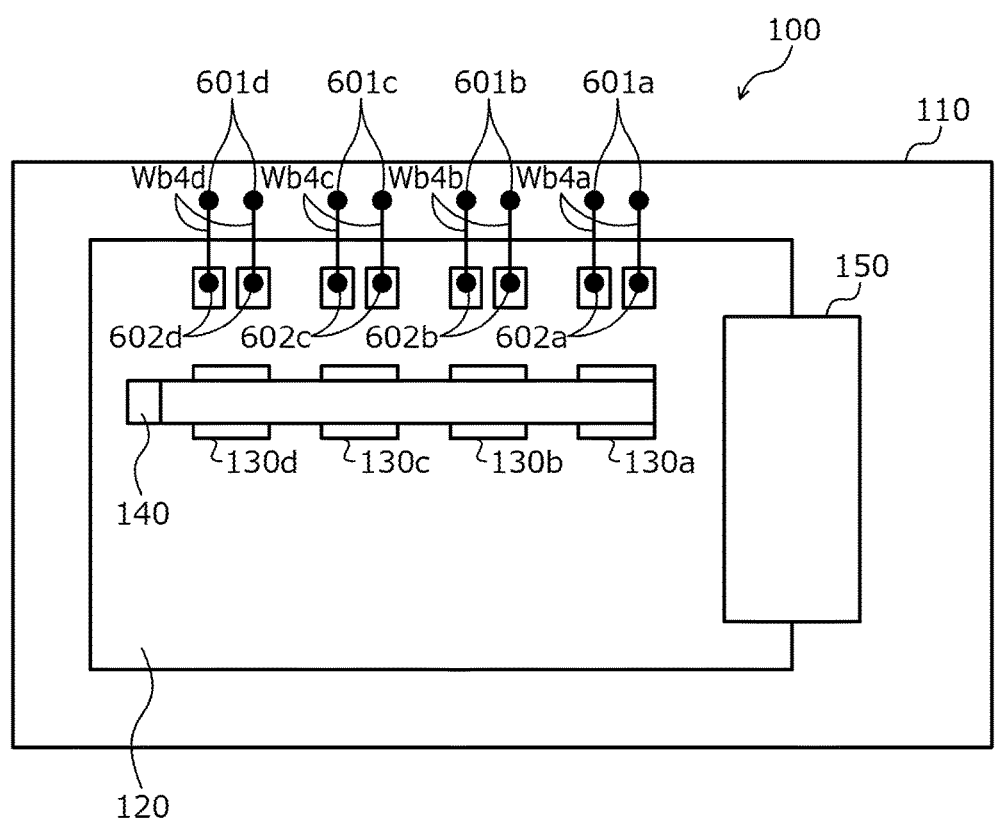
FIG. 6 is a diagram illustrating an example of an optical module according to Embodiment 2.

FIG. 6 is a diagram illustrating an example of an optical module according to Embodiment 2. In FIG. 6, the same reference numerals are given to the same configurations as those in FIG. 1, and the description thereof will be omitted. In FIG. 6, illustration of the optical waveguides 121a to 121d is omitted.

In the optical module 100 according to Embodiment 2 illustrated in FIG. 6, for example, terminals 601a to 601d are provided on the upper surface of the substrate 110. The terminals 601a to 601d are, for example, terminals connected to the electric circuit of the substrate 110, and are terminals from which drive power for the LDs 130a to 130d is output.

In the optical module 100 according to Embodiment 2, for example, terminals 602a to 602d are provided on the upper surface of the Si-Ph chip 120. The terminals 602a to 602d are, for example, terminals connected to the electric circuit of the Si-Ph chip 120, and are terminals to which drive power for the LDs 130a to 130d is input.

In the optical module 100 according to Embodiment 2, for example, the terminal 601a and the terminal 602a are connected by wire bonding Wb4a, and the terminal 601b and the terminal 602b are connected by wire bonding Wb4b. In the optical module 100 according to Embodiment 2, for example, the terminal 601c and the terminal 602c are connected by wire bonding Wb4c, and the terminal 601d and the terminal 602d are connected by wire bonding Wb4d.

For that reason, in the optical module 100 according to Embodiment 2, drive power for the LDs 130a to 130d may be input from the substrate 110 to the Si-Ph chip 120 via the wire bonding Wb4a to Wb4d instead of the power-feed substrate 160.

Accordingly, according to the optical module 100 of Embodiment 2, it is possible to reduce and equalize the temperatures of the LDs 130a to 130d while achieving miniaturization of the Si-Ph chip 120 without providing the power-feed substrate 160. For that reason, outputs of the LDs 130a to 130d may be stabilized, and quality of the optical signal output from the optical module 100 may be improved.

Embodiment 3

With respect to Embodiment 3, portions different from those in Embodiments 1 and 2 will be described. Embodiment 3 is an example in a case where positions where the LDs 130a to 130d, the metal bar 140, the control chip 150, the power-feed substrate 160, the shape of the metal bar 140, and the like are disposed are changed.

Example of Optical Module According to Embodiment 3

Figure 7:
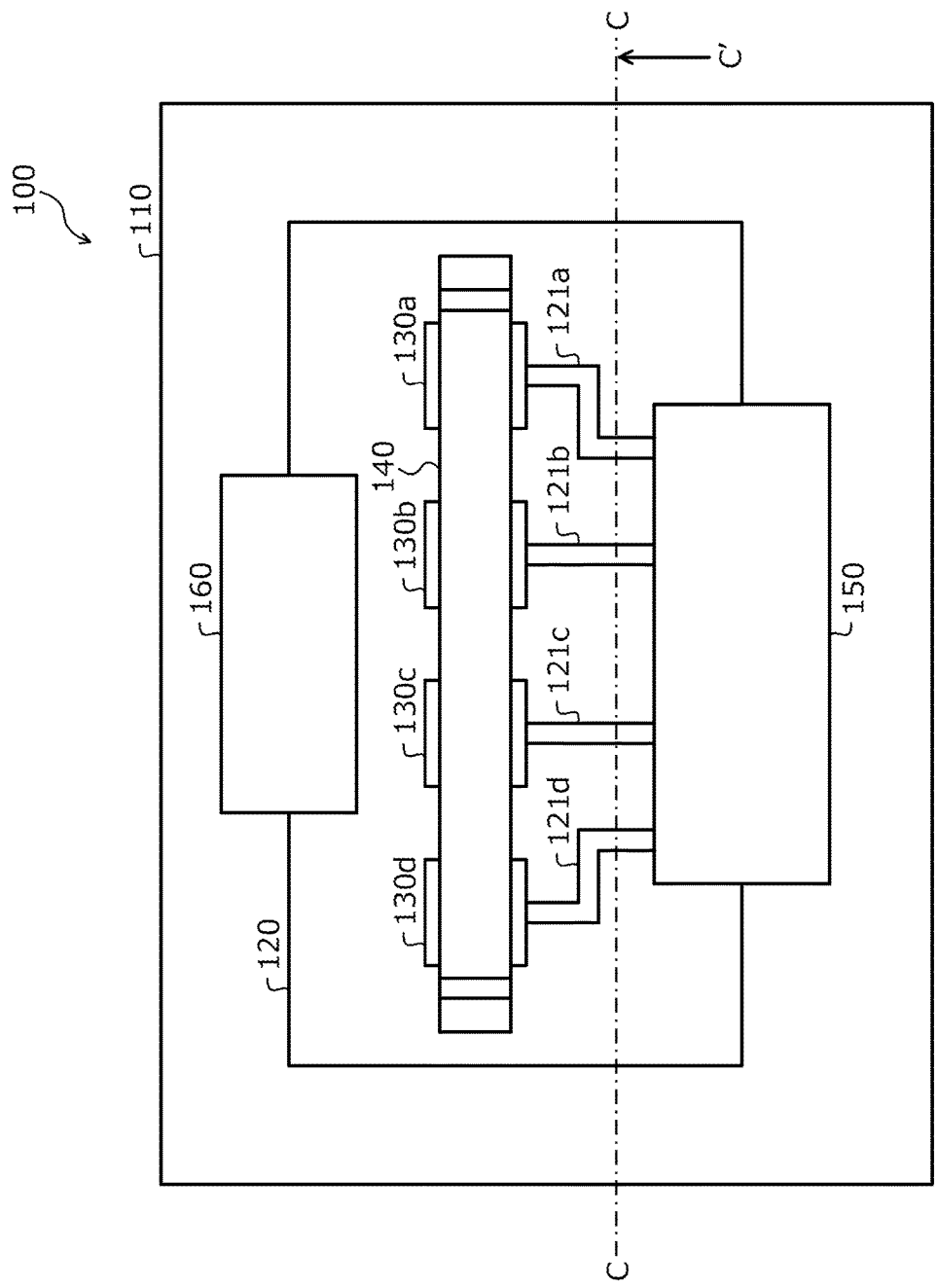
FIG. 7 is a diagram illustrating an example of an optical module according to Embodiment 3.

FIG. 7 is a diagram illustrating an example of an optical module according to Embodiment 3. In FIG. 7, the same reference numerals are given to the same configurations as those in FIG. 1, and the description thereof will be omitted.

In the optical module 100 according to Embodiment 3 illustrated in FIG. 7, the control chip 150 and the power-feed substrate 160 are disposed so as to be symmetrical by sandwiching the LDs 130*a* to 130*d*, which are disposed to be aligned along the longitudinal direction of the Si-Ph chip 120, between the control chip 150 and the power-feed substrate 160.

Also, in the case of the optical module 100 according to Embodiment 3, the optical modulator is provided, for example, at a position facing the control chip 150 in the Si-Ph chip 120. For that reason, as illustrated in FIG. 7, the optical waveguides 121*a* to 121*d* include a portion that allows light emitted from the LDs 130*a* to 130*d* to propagate to the optical modulator which is provided so as to face the control chip 150.

In the example illustrated in FIG. 7, the LD 130*b* and the LD 130*c* are disposed closer to the control chip 150 than the LD 130*a* and the LD 130*d*. For that reason, in the example illustrated in FIG. 7, the LDs 130*b* and 130*c* becomes LDs which are more likely to transfer heat from the control chip 150 than LDs 130*a* and LD 130*d* and tend to be high in temperature.

Example of Metal Bar According to Embodiment 3

Figure 8:
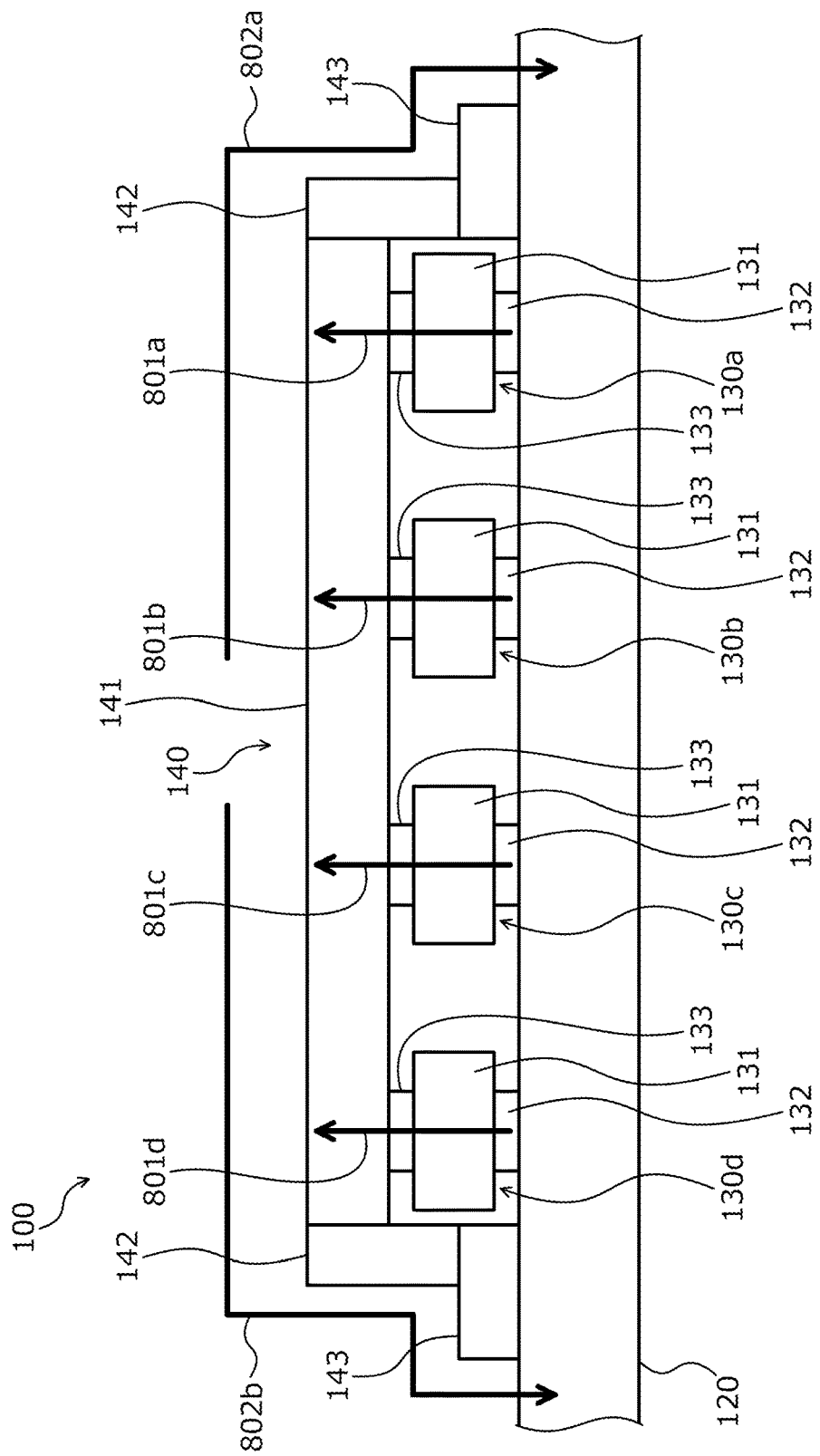
FIG. 8 is a diagram illustrating an example of a metal bar according to Embodiment 3.

FIG. 8 is a diagram illustrating an example of a metal bar according to Embodiment 3. FIG. 8 illustrates an example of a case where a cross-section taken along line C-C in FIG. 7 when viewed from C'. In FIG. 8, illustration of the substrate 110, the optical waveguides 121*a* to 121*d*, and the power-feed substrate 160 is omitted. Further, in FIG. 8, the same reference numerals are given to the same configurations as those in FIG. 2, and a description thereof will be omitted.

In the metal bar 140 according to Embodiment 3 illustrated in FIG. 8, for example, the side portion 142 and the lower portion 143 are respectively provided at the end portion of the upper portion 141 on the side of the LD 130*a* and the end portion on the side of the LD 130*d*.

The metal bar 140 according to Embodiment 3 is fixed to the upper surface of the Si-Ph chip 120, for example, by allowing both lower portions 143 to be fixed to predetermined positions on the upper surface of the Si-Ph chip 120 by screws, solder, or the like. For example, the terminal connected to the ground and the like are provided at a position where at least one of the lower portions 143 is fixed. For that reason, in a case where the metal bar 140 is fixed to the Si-Ph chip 120, it is possible to treat the metal bar 140 as a conductor connected to the ground.

In the case of the example illustrated in FIG. 8, heat of the LD 130*a* is transferred to the metal bar 140 as illustrated in a heat radiation path 801*a*, and heat of the LD 130*b* is transferred to the metal bar 140 as illustrated in a heat radiation path 801*b*. Heat of the LD 130*c* is transferred to the metal bar 140 as illustrated in a heat radiation path 801*c*, and heat of the LD 130*d* is transferred to the metal bar 140 as illustrated in a heat radiation path 801*d*.

Then, heat transferred to the metal bar 140 is transferred to the Si-Ph chip 120 as illustrated in the heat radiation path 802*a* and the heat radiation path 802*b*. With this, heat of the LDs 130*a* to 130*d* may be dispersed to the metal bar 140 and the Si-Ph chip 120, and the temperatures of the LDs 130*a* to 130*d* may be lowered.

Also, in the optical module 100 according to Embodiment 3, similarly to the optical module 100 according to Embodiment 2, the substrate 110 and the Si-Ph chip 120 may be electrically connected by wire bonding, instead of the power-feed substrate 160.

In the case of the optical module 100 according to Embodiment 3, for example, on the upper surface of the Si-Ph chip 120, a wiring connected to the ground may be provided at a position in contact with each terminal 132, and a terminal or the like from which a drive voltage is applied may be provided at a position in contact with one of the lower portions 143. By doing as described above, it is possible to apply the drive voltage collectively to each of the terminals 133 of the LDs 130*a* to 130*d* via the metal bar 140. Accordingly, also in this case, wirings of the LDs 130*a* to 130*d* may be simplified.

Embodiment 4

With respect to Embodiment 4, portions different from those in Embodiments 1 to 3 will be described. Embodiment 4 is an example in a case where the metal bar 140 is provided by being bonded to the power-feed substrate 160.

Example of Optical Module According to Embodiment 4

Figure 9:
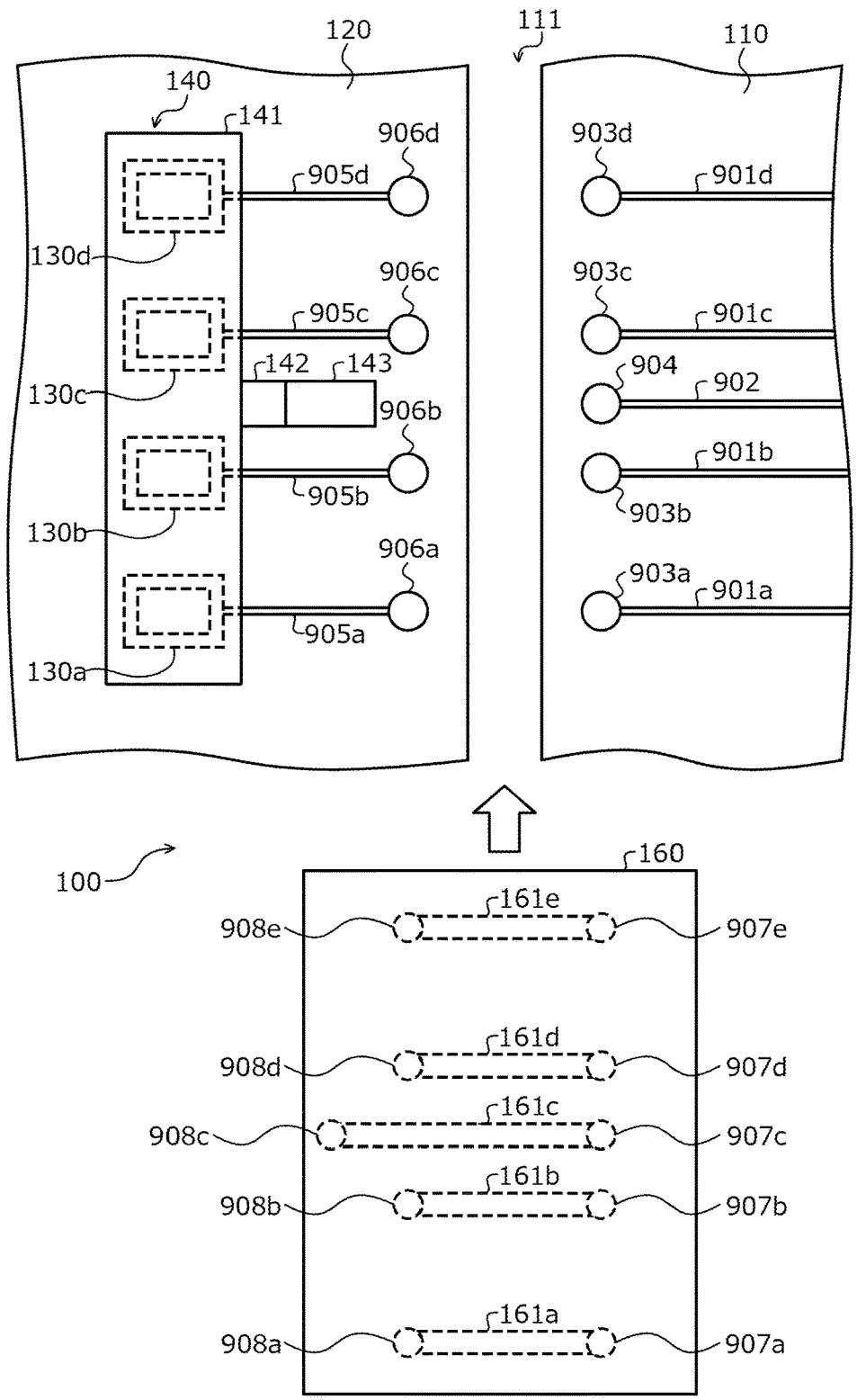
FIG. 9 is a diagram (first view) illustrating an example of an optical module according to Embodiment 4.
Figure 10:
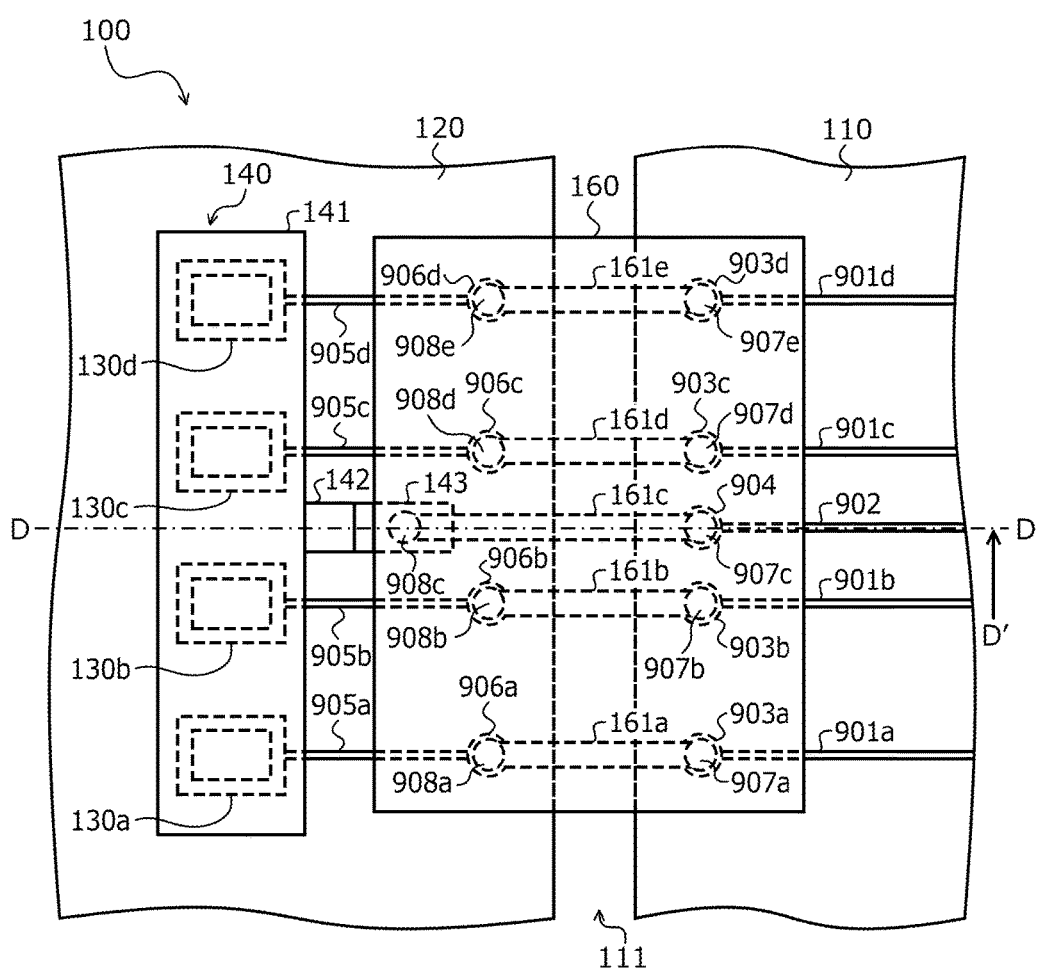
FIG. 10 is another diagram (second view) illustrating the example of the optical module according to Embodiment 4.

FIG. 9 is a diagram (first view) illustrating an example of an optical module according to Embodiment 4. FIG. 10 is a diagram (second view) illustrating an example of the optical module according to Embodiment 4. In FIGS. 9 and 10, the same reference numerals are given to the same configurations as those in FIG. 1, and the description thereof will be omitted.

For example, wirings 901*a* to 901*d* and wiring 902 are provided on the substrate 110 of the optical module 100 according to Embodiment 4 illustrated in FIG. 9 and the like. The wirings 901*a* to 901*d* and the wiring 902 are wirings connected to the electric circuit of the substrate 110 and are wirings for outputting drive power for the LDs 130*a* to 130*d*. For example, the wirings 901*a* to 901*d* are wirings to which the drive voltages for the LDs 130*a* to 130*d* are respectively applied. For example, the wiring 902 is a wiring connected to the ground in the electric circuit of the substrate 110.

The wirings 901*a* to 901*d* and the wiring 902 are provided so that one end thereof extends to the vicinity of the opening 111. A terminal 903*a* is provided at an end portion of the wiring 901*a* on the opening 111 side. Similarly, terminals 903*b* to 903*d* are provided at the end portions of the wirings 901*b* to 901*d* on the opening 111 side. A terminal 904 is provided at an end portion of the wiring 902 on the opening 111 side.

In the Si-Ph chip 120 of the optical module 100 according to Embodiment 4, wirings 905*a* to 905*d* are provided, for example. The wirings 905*a* to 905*d* are wirings connected to the electric circuit of the Si-Ph chip 120 and are wiring for supplying drive power for the LDs 130*a* to 130*d* to the LDs 130*a* to 130*d*.

For example, the wiring 905*a* is a wiring for supplying drive power for the LD 130*a* to the LD 130*a*. For that reason, one end of the wiring 905*a* is connected to the LD 130*a*. A terminal 906*a* is provided at the other end of the wiring 905*a*. For example, as illustrated in FIG. 9, a terminal 906*a* is provided at a position symmetrical with the terminal 903*a* by sandwiching the opening 111 between the terminals 906*a* and 903*a*.

Similarly, the wirings 905*b* to 905*d* are wirings for supplying drive power for the LDs 130*b* to 130*d* to the LDs 130*b* to 130*d*. For that reason, one ends of the wirings 905*b* to 905*d* are respectively connected to the LDs 130*b* to 130*d*. Terminals 906*b* to 906*d* are respectively provided at the other ends of the wirings 905*b* to 905*d*. For example, as illustrated in FIG. 9, the terminals 906*b* to 906*d* are provided at positions symmetrical with the terminals 903*b* to 903*d* by respectively sandwiching the opening 111 between the terminals 906*b* to 906*d* and the terminals 903*b* to 903*d*.

In the metal bar 140 of the optical module 100 according to Embodiment 4, for example, the side portion 142 and the lower portion 143 are provided on the terminals 906a to 906d side. Then, the lower portion 143 is fixed to the Si-Ph chip 120 at a position in the vicinity of the terminals 906a to 906d.

In the power-feed substrate 160 of the optical module 100 according to Embodiment 4, terminals 907a to 907e are provided on the end portions of the wirings 161a to 161e, which are provided on the lower surface of the power-feed substrate 160, on the side of the substrate 110. As illustrated in FIG. 10, for example, the terminal 907a is provided so as to face the terminal 903a when the power-feed substrate 160 is disposed across the substrate 110 and the Si-Ph chip 120. When the power-feed substrate 160 is disposed across the substrate 110 and the Si-Ph chip 120, the terminals 907a and 903a are bonded by bumps, solder, or the like. With this, the wiring 161a of the power-feed substrate 160 is electrically connected to the wiring 901a of the substrate 110.

As illustrated in FIG. 10, for example, the terminal 907b is provided so as to face the terminal 903b when the power-feed substrate 160 is disposed across the substrate 110 and the Si-Ph chip 120. When the power-feed substrate 160 is disposed across the substrate 110 and the Si-Ph chip 120, the terminals 907b and 903b are bonded by bumps, solder, or the like. With this, the wiring 161b of the power-feed substrate 160 is electrically connected to the wiring 901b of the substrate 110.

As illustrated in FIG. 10, for example, the terminal 907c is provided so as to face the terminal 904 when the power-feed substrate 160 is disposed across the substrate 110 and the Si-Ph chip 120. When the power-feed substrate 160 is disposed across the substrate 110 and the Si-Ph chip 120, the terminals 907c and 904 are bonded by bumps, solder, or the like. With this, the wiring 161c of the power-feed substrate 160 is electrically connected to the wiring 902 of the substrate 110.

As illustrated in FIG. 10, for example, the terminal 907d is provided so as to face the terminal 903c when the power-feed substrate 160 is disposed across the substrate 110 and the Si-Ph chip 120. When the power-feed substrate 160 is disposed across the substrate 110 and the Si-Ph chip 120, the terminals 907d and 903c are bonded by bumps, solder, or the like. With this, the wiring 161d of the power-feed substrate 160 is electrically connected to the wiring 901c of the substrate 110.

As illustrated in FIG. 10, for example, the terminal 907e is provided so as to face the terminal 903d when the power-feed substrate 160 is disposed across the substrate 110 and the Si-Ph chip 120. When the power-feed substrate 160 is disposed across the substrate 110 and the Si-Ph chip 120, the terminals 907e and 903d are bonded by bumps, solder, or the like. With this, the wiring 161e of the power-feed substrate 160 is electrically connected to the wiring 901d of the substrate 110.

In the power-feed substrate 160 of the optical module 100 according to Embodiment 4, terminals 908a to 908e are provided at the end portions of the wirings 161a to 161e, which are provided on the lower surface of the power-feed substrate 160, on the Si-Ph chip 120 side. As illustrated in FIG. 10, for example, the terminal 908a is provided so as to face the terminal 906a when the power-feed substrate 160 is disposed across the substrate 110 and the Si-Ph chip 120. When the power-feed substrate 160 is disposed across the substrate 110 and the Si-Ph chip 120, the terminals 908a and 906a are bonded by bumps, solder, or the like. With this, the wiring 161a of the power-feed substrate 160 is electrically connected to the wiring 905a of the substrate 110.

As illustrated in FIG. 10, for example, the terminal 908b is provided so as to face the terminal 906b when the power-feed substrate 160 is disposed across the substrate 110 and the Si-Ph chip 120. When the power-feed substrate 160 is disposed across the substrate 110 and the Si-Ph chip 120, the terminals 908b and 906b are bonded by bumps, solder, or the like. With this, the wiring 161b of the power-feed substrate 160 is electrically connected to the wiring 905b of the substrate 110.

As illustrated in FIG. 10, for example, the terminal 908c is provided so as to face the lower portion of the metal bar 140 when the power-feed substrate 160 is disposed across the substrate 110 and the Si-Ph chip 120. When the power-feed substrate 160 is disposed across the substrate 110 and the Si-Ph chip 120, the terminal 908c and the lower portion 143 are bonded by bumps, solder, or the like. With this, the wiring 161c of the power-feed substrate 160 is electrically connected to the metal bar 140.

As illustrated in FIG. 10, for example, the terminal 908d is provided so as to face the terminal 906c when the power-feed substrate 160 is disposed across the substrate 110 and the Si-Ph chip 120. When the power-feed substrate 160 is disposed across the substrate 110 and the Si-Ph chip 120, the terminal 908d and the terminal 906c are bonded by bumps, solder, or the like. With this, the wiring 161d of the power-feed substrate 160 is electrically connected to the wiring 905c of the Si-Ph chip 120.

As illustrated in FIG. 10, for example, the terminal 908e is provided so as to face the terminal 906d when the power-feed substrate 160 is disposed across the substrate 110 and the Si-Ph chip 120. When the power-feed substrate 160 is disposed across the substrate 110 and the Si-Ph chip 120, the terminal 908e and the terminal 906d are bonded by bumps, solder, or the like. With this, the wiring 161e of the power-feed substrate 160 is electrically connected to the wiring 905d of the Si-Ph chip 120.

Although illustration is omitted in FIGS. 9 and 10, in the optical module 100 according to Embodiment 4, the control chip 150 is disposed on the left side (that is, side opposite to the side portion 142 and the lower portion 143) of the metal bar 140 in FIGS. 9 and 10. Each of the optical waveguides 121a to 121d includes a portion that allows light emitted from the LDs 130a to 130d to propagate to the optical modulator which is provided so as to face the control chip 150 disposed on the left side of the metal bar 140.

Example of Metal Bar According to Embodiment 4

Figure 11:
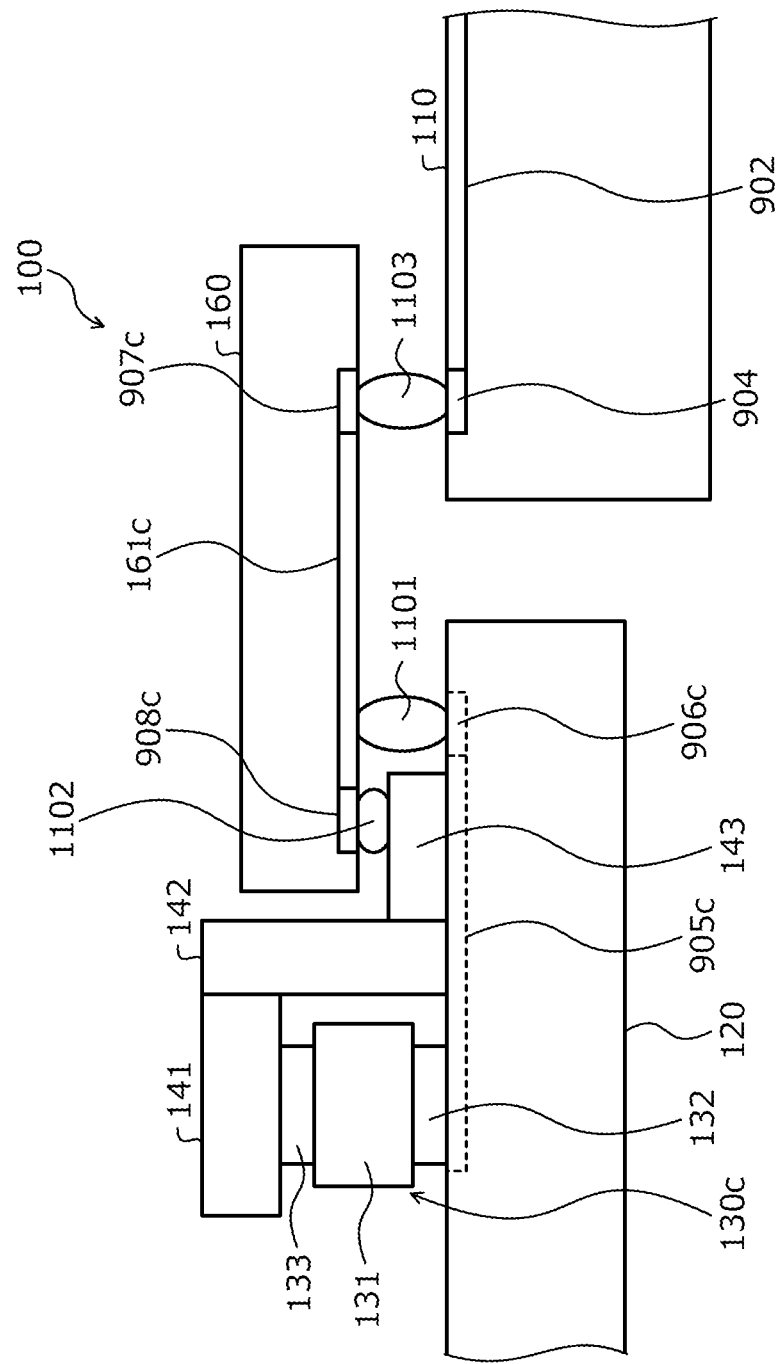
FIG. 11 is a diagram illustrating an example of a metal bar according to Embodiment 4.

Next, an example of the metal bar 140 according to Embodiment 4 will be described. FIG. 11 is a diagram illustrating an example of the metal bar according to Embodiment 4. FIG. 11 illustrates an example of a case where a cross-section taken along line D-D in FIG. 10 when viewed from D'. In FIG. 11, the same reference numerals are given to the same configurations as those in FIG. 2, FIG. 9, and FIG. 10.

As illustrated in FIG. 11, the terminal 132 of the LD 130c is in contact with the wiring 905c of the Si-Ph chip 120, for example. The terminal 906c of the end portion of the wiring 905c on the substrate 110 side is bonded to the terminal 908d of the power-feed substrate 160 by solder 1101. With this, the drive voltage for the LD 130c may be applied to the terminal 132 of the LD 130c.

The terminal 133 of the LD 130c is in contact with the upper portion 141 of the metal bar 140. The lower portion 143 of the metal bar 140 is bonded to the terminal 908c of the wiring 161c on the power-feed substrate 160 by solder 1102. The terminal 907c on the opposite side of the wiring 161c is bonded to the terminal 904 of the substrate 110 by solder 1103.

With this, the terminal 133 of the LD 130c may be electrically connected to the ground. For that reason, drive power may be supplied to the LD 130c, and the LD 130c may be driven. Although illustration and detailed description are omitted, the LDs 130a, 130b, and 130d are also the same as the LD 130c.

As described above, in the optical module 100 according to Embodiment 4, the metal bar 140 is bonded to the power-feed substrate 160. Accordingly, in the optical module 100 according to Embodiment 4, heat of the LDs 130a to 130d transferred to the metal bar 140 may be directly transferred from the metal bar 140 to the power-feed substrate 160. With this, it is possible to more efficiently transfer heat of the LDs 130a to 130d transferred to the metal bar 140 to the power-feed substrate 160 than a case where heat is transferred to the power-feed substrate 160 via the Si-Ph chip 120, and the temperatures of the LDs 130a to 130d may be lowered.

In the case of the optical module 100 according to Embodiment 4, for example, the terminals 903a to 903d of the substrate 110 may be used as terminals connected to the ground wiring and the terminal 904 may be used as a terminal to which the drive voltages of the LDs 130a to 130d are applied. By doing as described above, it is possible to apply the drive voltage collectively to the terminals 133 of the LDs 130a to 130d via the power-feed substrate 160 and the metal bar 140. Accordingly, also in this case, the wirings of the LDs 130a to 130d may be simplified.

In the case of the optical module 100 according to Embodiment 4, the metal bar 140 may be thermally and electrically connected to the substrate 110 by the power-feed substrate 160 and thus, the metal bar 140 may not be in contact with the Si-Ph chip 120.

As described above, according to the optical module of the embodiments, it is possible to equalize temperatures of a plurality of laser diodes by allowing heat of the control chip to flow to the substrate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
a substrate;
a silicon photonics chip disposed in an opening of the substrate;
a control chip disposed across the substrate and the silicon photonics chip;
a plurality of laser diodes disposed over the silicon photonics chip; and
a metallic bar in contact with each of terminals of the plurality of laser diodes and electrically coupling each of the terminals with the silicon photonics chip or the substrate, the metallic bar is positioned opposite the silicon photonics chip across a plurality of laser diodes.

2. The optical module according to claim 1, wherein
the metallic bar includes a portion in contact with each of the terminals and portions for holding the portion in contact with each of the terminals by coming into contact with the silicon photonics chip, and
the portions for holding the portion are arranged at positions other than a position closest to the control chip in the metallic bar.

3. The optical module according to claim 1, further comprising:
a power-feed substrate disposed across the substrate and the silicon photonics chip and electrically connecting the substrate with the silicon photonics chip.

4. The optical module according to claim 3, wherein the power-feed substrate is bump-bonded to the substrate.

5. The optical module according to claim 3, wherein the power-feed substrate is bump-bonded to the silicon photonics chip.

6. The optical module according to claim 3, wherein the metallic bar is bump-bonded to the power-feed substrate.

7. The optical module according to claim 1, wherein the control chip is bump-bonded to the substrate.

8. The optical module according to claim 1, wherein the control chip is bump-bonded to the silicon photonics chip.

9. The optical module according to claim 1, wherein
the plurality of laser diodes emit light to optical waveguides of the silicon photonics chip, and
the control chip modulates light emitted from the plurality of laser diodes by controlling an optical modulator arranged in the optical waveguide.

* * * * *